(12) United States Patent
Poeschl et al.

(10) Patent No.: US 11,260,574 B2
(45) Date of Patent: Mar. 1, 2022

(54) FLEXIBLE PLANT FOR TREATING CONTAINERS

(71) Applicant: KRONES AG, Neutraubling (DE)

(72) Inventors: Stefan Poeschl, Sinzing (DE); Wolfgang Hausladen, Moetzing (DE)

(73) Assignee: KRONES AG, Neutraubling (DE)

( * ) Notice: Subject to any disclaimer, the term of this patent is extended or adjusted under 35 U.S.C. 154(b) by 72 days.

(21) Appl. No.: 16/643,097

(22) PCT Filed: Sep. 10, 2018

(86) PCT No.: PCT/EP2018/074314
§ 371 (c)(1),
(2) Date: Feb. 28, 2020

(87) PCT Pub. No.: WO2019/048677
PCT Pub. Date: Mar. 14, 2019

(65) Prior Publication Data
US 2020/0346394 A1    Nov. 5, 2020

(30) Foreign Application Priority Data
Sep. 8, 2017 (DE) .................... 10 2017 120 762.7

(51) Int. Cl.
*B29C 49/48* (2006.01)
*B29C 49/64* (2006.01)
(Continued)

(52) U.S. Cl.
CPC .......... *B29C 49/6418* (2013.01); *B29C 49/24* (2013.01); *B29C 49/36* (2013.01);
(Continued)

(58) Field of Classification Search
CPC ........ B29C 2049/4871; B29C 49/4205; B29C 49/6418; B29C 49/24; B29C 49/36; B29C 49/78; B29C 2049/4858; B29C 2795/007
See application file for complete search history.

(56) References Cited

U.S. PATENT DOCUMENTS

2011/0061347 A1* 3/2011 Stoiber ................. B67B 3/26
                                                      53/558
2011/0236517 A1   9/2011 Senn et al.
(Continued)

FOREIGN PATENT DOCUMENTS

CN    102131629 A    7/2011
CN    102205625 B    7/2014
(Continued)

OTHER PUBLICATIONS

International Search Report dated Dec. 20, 2018 for PCT/EP2018/074314.

*Primary Examiner* — Robert B Davis
(74) *Attorney, Agent, or Firm* — Schmeiser, Olsen & Watts, LLP

(57) ABSTRACT

Provided is a device for treating containers, comprising a heating device for heating plastic preforms, wherein the heating device has a plurality of heating stations which are suitable for individually heating the plastic preforms, and wherein the heating device has a transport device which transports the plastic preforms individually through the heating device, and comprising a reshaping device which is suitable and intended for reshaping the plastic preforms heated by the heating device into plastic containers. This reshaping device is arranged downstream of the heating device in the transport direction of the plastic preforms, and the reshaping device has a movable support, on which a plurality of reshaping stations are arranged for reshaping the plastic preforms into the plastic containers. The device also (Continued)

comprises a transport device, for transporting the heated plastic preforms individually from the heating device to the reshaping device, and a decorating device.

11 Claims, 3 Drawing Sheets

(51) Int. Cl.
    *B29C 49/78*     (2006.01)
    *B29C 49/24*     (2006.01)
    *B29C 49/36*     (2006.01)
    *B29C 49/42*     (2006.01)
    *B29C 49/46*     (2006.01)
    *B29K 67/00*     (2006.01)
    *B29L 31/00*     (2006.01)

(52) U.S. Cl.
    CPC .......... *B29C 49/4205* (2013.01); *B29C 49/46* (2013.01); *B29C 2049/2489* (2013.01); *B29C 2049/4664* (2013.01); *B29C 2049/4697* (2013.01); *B29C 2795/007* (2013.01); *B29K 2067/003* (2013.01); *B29L 2031/7158* (2013.01)

(56) References Cited

U.S. PATENT DOCUMENTS

| | | | |
|---|---|---|---|
| 2012/0091636 A1 | 4/2012 | Voth | |
| 2013/0026005 A1* | 1/2013 | Senn | B65G 47/082 |
| | | | 198/465.2 |
| 2015/0079220 A1 | 3/2015 | Lindner | |

FOREIGN PATENT DOCUMENTS

| | | |
|---|---|---|
| CN | 104760262 B | 8/2017 |
| DE | 202007008120 U1 | 8/2007 |
| DE | 102010003350 A1 | 9/2011 |
| DE | 102010042165 A1 | 4/2012 |
| DE | 102012102357 A1 | 9/2013 |
| DE | 102013113074 A1 | 5/2015 |
| EP | 2918391 A1 | 9/2015 |
| EP | 2447038 B1 | 4/2017 |

* cited by examiner

FLEXIBLE PLANT FOR TREATING CONTAINERS

CROSS-REFERENCE TO RELATED APPLICATIONS

This application claims priority to PCT Application No. PCT/EP2018/074314, having a filing date of Sep. 10, 2018, based on German Application No. 10 2017 120 762.7, having a filing date of Sep. 8, 2017, the entire contents both of which are hereby incorporated by reference.

FIELD OF TECHNOLOGY

The following relates to a machine and a method for processing containers. Numerous such machines are known from conventional art. These usually have an oven which heats plastic preforms, as well as a reshaping device arranged downstream of this oven, such as for example a blow molding machine which reshapes the plastic preforms into the plastic containers. Furthermore, such plants often also have a labeling device, a filling device which fills the containers, as well as a closing device which closes the filled containers with closures.

BACKGROUND

However, such machines often have the disadvantage that they can only be modified with difficulty, and are modified to different container types, different filling materials and the like. In this case as a rule only one container type can be produced are being, as a rule only one label can be attached and also only one product type can be introduced. This is usually due to inherently rigid and inert functions or processes in the machine.

With this conventional art it is not possible to implement the flexibility required more recently by the customers or end customers. Elaborate setup processes as well as setup times are always necessary, which are required in order to convert to different containers or products. At the same time this means higher costs for production and end product.

SUMMARY

An aspect relates to increasing the variability and flexibility of such machines.

A machine according to embodiments of the invention for treating containers has a heating device for heating plastic preforms, wherein the heating device has a plurality of heating stations which are suitable for individual heating of the plastic preforms. Furthermore, the heating device has a transport device, which transports the plastic preforms individually through the heating device, and a reshaping device which is suitable and intended for reshaping the plastic preforms, which have been heated by the heating device, into plastic containers. In this case this reshaping device is arranged downstream of the heating device in the transport direction of the plastic preforms, and the reshaping device has a movable support on which a plurality of reshaping stations are arranged for reshaping the plastic preforms into the plastic containers. Furthermore, a transport device is also provided, which is suitable and intended for transporting the heated plastic preforms individually from the heating device to the reshaping device, and, furthermore, a decorating device is provided, which is arranged downstream of the reshaping device in the transport direction of the plastic containers. This decorating device has a transport device for individually transporting the plastic containers, and the decorating device has at least one decorating assembly or a plurality of decorating assemblies which are suitable and intended for decorating the plastic containers. The machine also has a filling device for filling the plastic containers, wherein this filling device is suitable and intended for filling the plastic containers with at least two different liquids and in particular beverages.

According to embodiments of the invention, the machine has an assigning device and/or (generally) an assigning option which allows at least one assigning process of at least one heating station, at least one reshaping station and/or at least one decorating assembly and/or at least one filling device. It is therefore proposed that an assignment in particular by the control means takes place between the individual assemblies, so that a specific heating device is assigned to a specific reshaping station and/or also to a specific decorating assembly. More precisely, it should be specified that a specific plastic preform is heated by a specific heating device, then reshaped by a reshaping station assigned thereto, and is then decorated by a decorating device which is already provided. In this way different containers can be manufactured with the same plant without elaborate changes of format. It is therefore proposed that different containers, container decorations and product fillings are achieved, in particular by the use of flexible function or process modules, wherein this is possible depending upon the technical configuration of the entire or assembled functional modules.

In this case different assignments are possible. Thus, a specific heating station can be assigned to a specific reshaping station, a specific decorating device and/or a specific filling element. In a corresponding manner an assignment of the reshaping stations, the decorating devices and the filling elements is also possible.

The decorating device may be for example a labeling device which provides the containers with labels. In this case it would be conceivable that the labeling takes place by means of an additional glue applied for instance to the labels. However, labeling devices can also be used which apply self-adhesive labels to the containers.

In addition, the decorating device may also be a printing device which applies an imprint to the containers.

In further advantageous embodiments one or more closure producing devices can also be provided which produce container closures. These closure producing devices may be for example digital printing devices which produce these container closures.

Due to this assignment at least in some instances the substantially simultaneous production of two products is possible. The expression "substantially simultaneous" is understood to mean that at least two products can be produced during one operation, in particular without refitting work having to be carried out on the machine for this purpose. "Two different products" is understood to mean two products which differ in at least one feature, wherein the feature is in particular selected from a group of features which includes a container shape, a container size, a label, an imprint, a closure or the like.

At least an association between a first assembly of a first treatment device (heating device, reshaping device, decorating device, filling device) and a first assembly of a second treatment device is possible. An assignment of a plurality of assemblies of the different treatment devices and particularly of all assemblies.

Thus, in the future, for example, the heating of the plastic preforms can take place in one single process, wherein individual plastic preforms of different geometry and weight can be heated. Depending upon the requirement, a correspondingly flexible filling valve can fill more than one, more than two, or more than three, for example up to five different products and quantities of products. In addition, a control device can also be provided which can enable this flexibility and in this way can guarantee a greater customer benefit in relation to flexibility in the filling technology.

Thus, an increased flexibility in the product production is achieved. Simultaneous filling with different products is also possible according to the containers, the label, the product and the closures.

In addition, the possibility also exists of operating a line according to a single type and/or, if required, to process the most varied products simultaneously. The advantage here is shorter times for refitting and thus also cost advantages by comparison with conventional art.

In this way a high degree of flexibility of the plant is achieved, since the plant can be adapted flexibly between types of container, filling materials etc.

The machine for reshaping plastic preforms into plastic containers is a blow molding machine. This means that the plastic preforms are first of all thermally conditioned in a heating section and then are expanded by application of a liquid or gaseous medium. The flowable medium is under pressure. For the delivery of the pressurized medium the machine has a blow molding die which can be placed onto a mouth of the plastic preforms to form a seal, in order thus to expand the plastic preforms with liquid or gaseous medium. In addition, a valve assembly is also provided, which controls the delivery of the blowing air to the plastic preforms.

The blow molding machine is a stretch blow molding machine, which means that before and/or during the expansion the preforms are expanded in the longitudinal direction by means of a stretching rod. In this case the blow molding stations each have stretching rods, which can be introduced into the plastic preforms and expand the plastic preforms in their longitudinal direction. In this case the stretching rods have an electrical drive.

The reshaping device is a machine which reshapes the plastic preforms into plastic containers by means of a gaseous medium and in particular by means of blowing air. However, a reshaping device could also be used, which expands the plastic preforms by application thereto of a liquid medium and in particular a product which is to be introduced. In this case the plastic preform is also reshaped into the plastic container, in particular the plastic bottle, by the introduction of a filling material. In this case the machine can for example have filling valves which are suitable and intended for introduction of a liquid into the plastic preform.

In advantageous embodiments a plurality of blow molding stations are arranged on a common movable support. In this case this support is in particular a rotatable support. The blow molding stations each have a blow molding device forming a hollow space inside which the plastic preforms can be expanded into the plastic containers. In this case these blow molding devices are formed in multiple parts and each have two blow mold halves and a base mold. These blow mold halves can be releasably arranged on a mold support shell or on the blow mold supports. The blow mold supports are pivotable with respect to one another, in order to open and to close the blow molding devices. Moreover, the blow mold support has locking mechanisms in order to lock the mold halves with respect to one another during the blow molding process.

Particularly, the blow molding machine or the supports and the blow molding arrangements are arranged inside a clean room which demarcates the blow molding machine relative to an unsterile environment. In this case, driving devices for the closing, locking and/or opening of the blow molds are arranged outside the clean room.

The blow mold devices are transported inside the clean room. The clean room is delimited by a plurality of walls. In this case the clean room is delimited by at least one stationary wall and a wall which is movable relative to this stationary wall. The clean room demarcates the blow molds in particular from an unsterile environment. The clean room is advantageously formed in an annular or toroidal manner around the blow molding stations or reshaping stations and/or the transport path of the plastic containers.

In further advantageous embodiments the heating device enables the individual heating of the plastic preforms. Whereas continuous ovens through which the plastic preforms run are usually used in conventional art, here it is proposed that the heating device enables an individual and optionally also individually different heating of individual plastic preforms. The transport device of the heating device has a movable support on which the heating stations are arranged. In this case an individual plastic preform can be assigned to each individual heating station. The heating device is a microwave heating device, but an infrared heating device could also be used.

By the use of a microwave heating device plastic preforms can be heated differently, depending upon weight, contour, colour etc., and also the later configuration of the container contour and the filling volume. A microwave unit can heat the plastic preform individually, independently of another microwave unit. Depending upon how the blow molding module is equipped with different blow molds inside a blow molding carousel, this can be occupied by the different plastic preforms (colour, contour, size, temperature profile etc.). Here, however, an unambiguous assignment of a defined plastic preform to the appropriate blow mold should be guaranteed.

Upstream of the heating device the different plastic preforms are already transferred in advance to the correct heating device, so that the plastic preforms are passed on with the appropriate temperature profile to the assigned blow molding or reshaping station.

In preferred embodiments the machine has at least one feed device for feeding plastic preforms to the heating device, wherein this feed device is suitable and intended to feed at least two different types of plastic preforms to the heating device selectively and individually. In this case it would also be possible that this feed device has a plurality of feed tracks which allow the delivery of different types of plastic preforms, for instance plastic preforms which have a different colour, a different size or also a different weight.

In other words the feeding of the plastic preforms can be carried out predominantly by a special feeding technology, that is to say depending upon a maximum number of plastic preform variants to be processed and/or the type of flexibility of the plant a number n of feed devices for plastic preforms are provided for example in the form of roller sorters and peripherals thereof.

The removal of the respective plastic preforms from the associated plastic parison feed is particularly flexible and/or has an intelligent distribution system. In this case, with a permanently assigned mixing ratio this distribution system can be implemented partially by a purely mechanical solution. In addition, an electromechanical distribution system can also be provided which facilitates individual feeding of the plastic preforms to the heating device, for example the microwave stations, and so allows a high variation of distributing and assigning options.

In further advantageous embodiments the machine has a changing device and in particular a changing robot which is suitable and intended for changing blow molds of the individual reshaping stations of the reshaping device. In this case this changing robot can have a gripping device which is suitable and intended for removing blow molds either in their entirety or in individual parts and replacing them different blow molds or blow mold parts. In this case this gripping device can advantageously swivel about at least three axes, for example about three axes perpendicular to one another. In this way an automatic changing of blow molds can be facilitated.

In further advantageous embodiments the transport device which transports the plastic preforms from the heating device to the reshaping device is suitable and intended for changing a sequence of plastic preforms discharged from the heating device, so that these plastic preforms are transferred to the reshaping device in a modified sequence.

It is provided that the individual plastic preforms (in particular with their individual temperature profiles) are transferred by the heating device to a blow mold or reshaping station intended therefor. In this case the reshaping stations of the reshaping device can be equipped with identical blow molds, that is to say the reshaping device produces containers according to a single type. However, the reshaping stations of the reshaping device can also be equipped with different blow molds in particular in a defined ratio, that is to say in this case different containers (with regard to colour, volume, contour etc.) are produced during a rotation of a blow molding wheel. In this case it is ensured that the ratio of the heating stations, for example of the microwave heating stations, is adapted to the blow molding stations or reshaping stations. Nowadays the process time for the heating of the plastic preforms is usually longer than, for example twice as long as the process time for producing or reshaping a container, in particular the stretch blow molding of a container.

Alternatively, or in addition, the use of a flexible transport device, for example in the form of a long stator system between the heating device and the reshaping device, would also be conceivable. To a certain extent such a transport device allows a "chaotic" or random heating of the plastic preforms. In this case it is also possible that a ratio of different plastic preforms or containers can be managed in a predetermined time window, in particular as a function of the predetermined equalization time and/or the residence time for the plastic preforms in the transport device, for example the long stator system.

The large spaces in a microwave oven and a reshaping device allow plastic preforms, which circulate in a long stator module, can be moved through between the heating devices and the reshaping stations without collision. However, it should be ensured that in the transport device, for example in the long stator module, empty movement units, for instance movers, move between movers equipped with plastic preforms, in order in this way to be able to accommodate new heated plastic preforms. In addition, a transport device could also be provided with a routing function, for example a long stator with a routing function.

Thus, for example in the event of processing of three different plastic preforms, the transport device, for instance the long stator thereof, could have an oval, wherein one or two parallel sections which are coupled by means of routing segments can be arranged parallel to this oval. In this case it is possible that for example a first preform type moves over the oval, a second plastic preform can move over the oval or can be routed onto the first parallel section and can then move onto the oval again when required. A third type of plastic preforms can likewise be transported over the oval to the reshaping device or can be routed over the second parallel section and can be transported over the oval again to the reshaping device when required.

In addition, it would also be possible that buffering devices are provided which, if required, pass on a required plastic preform to the reshaping device.

In further advantageous embodiments a cooling device for cooling the plastic is provided between the reshaping device and the decorating device and/or downstream of the reshaping device. Thus, it is possible that after the heating of the plastic preforms and the production of the containers by means of a stretch blow molding process the containers are transferred to a labeling machine. A module for cooling components of the container and in particular of the container base can be integrated between the stretch blow molding machine and the labeling machine. In this case it may be problematic that containers of different heights (the neck ring corresponds to a reference height) are also treated by the cooling system, that is to say the cooling systems usually arranged below the containers which are running through should in principle reach the outside of the container base due to the cooling medium used and/or should reach the defined process spacing.

In this case different systems could be used. Thus, it would be possible that the container base is cooled by means of stationary nozzles, which produce jets of water which must reach container bases with different heights. In this case, however, with high container bases the wall of the container is wetted with more cooling medium, which in turn leads to a higher carry-over of a cooling medium. In a preferred embodiment the machine has application systems such as for example nozzles which are controllable with regard to at least one parameter, which can be regulated for example with regard to the amount of liquid reaching the container base and/or an exit velocity of the liquid (generally the medium) from the nozzles and/or with regard to a flow cross-section of the exiting liquid.

In addition, a synchronously running base cooling would also be conceivable, wherein a liquid cooling medium is used. In this case the jet of cooling medium is so high that it reaches the container bases of different heights or each individual nozzle is individually adjustable in height. Thus, it would be possible that the individual nozzles are adjustable in height relative to the containers and so more can be advanced for instance towards container bases. Also, in this configuration it would be possible that the respective cooling medium nozzles are also assigned to the blow molding modules, in order to adapt the height of the nozzles to the corresponding container heights already before the production begins. This may take place mechanically and/or electromechanically.

Such a system is also suitable when instead of a liquid cooling medium an atomized cooling medium or also a gas is used, since the spacing between the containers relative to the respective nozzles is adjustable. As mentioned, cooled air would also be conceivable as cooling medium, although relatively complex in design.

In further advantageous embodiments the decorating device is suitable and intended for decorating different container formats.

Containers of different heights and also of different diameters must be imprinted and/or labeled in a printing machine and/or a labeling machine. This can take place for example by the use of solutions described below for gripping and/or fixing containers of different heights.

Thus, it would be possible for example that the containers are transferred from a feed star wheel by means of neck handling to a container table. A container gripping device can grip the containers in the region of the mouthpiece, wherein the gripping can take place by means of a force fit and/or form fit. The gripping device has its own servomotor, which rotates the containers upstream of the labeling assembly and in particular rotates the container about the container axis at a required rotational speed and also in the direction of rotation in order thus to carry out the labeling process. The base of the containers is not centred or supported in this approach to a solution. In addition, it would also be conceivable that the containers are fixed and/or centred on a container table in a mouthpiece by means of a so-called centering bell and are fixed or centred on the container base for example by means of a centering plate. In this case it is conceivable that this centering plate can accommodate different container diameters and also centre them correspondingly.

This can take place for example by a conical internal contour which can centre different diameters. In order to achieve an entrainment of the containers when rotation is initiated, a spring-loaded container plate is optionally used with a covering for good friction properties. This container plate is moved electromechanically towards the container base performed and grips it with a defined force between the centering bell and the container plate.

As a rule, an electromechanical lifting device can already approach a transfer position, since due to the blow molding machine and the mechanical or electromechanical coupling of the functional modules the respective container plate already beforehand obtains the information as to which container height is to be gripped next.

In this case for example a servomotor can also be present for the rotation of the containers. This servomotor may be constructed for example in a hollow shaft design, wherein a lifting mechanism for the container plate is integrated by the hollow shaft. This is also conceivable in an electromechanical design.

A container decoration, for example in the case of disposable containers such as PET containers, can take place by wraparound labels or self-adhesive labels. These labels are applied to the containers by means of dispensing assemblies. In this case, depending upon the size of a basic machine for example a number n of assemblies or a number m of different labels can be processed simultaneously. In this case it should be noted that according to the current state of the art label transfers often take place very close to the container, that is to say at the same time as processing of different container diameter it would be preferable that the individual labeling assemblies for smaller container diameters have a disengagement function in order not to collide with larger passing containers.

In other words, the machine has drive means which facilitate a movement of labeling assemblies relative to the transport path of the containers and for example a movement away or pivoting away of the labeling assembly, if only for short periods of time. This procedure also applies correspondingly for instance for any brushing on or for rolling boards in the respective basic machine or the labeling machine.

Different procedures are conceivable for the labeling process itself. Currently methods are known from conventional art in which the cut labels are transferred from a roller to a vacuum cylinder, which for example by means of raised vacuum strips draws the label in at the start and end. Then the labels are guided past a glue roller and the start of a label and the end of a label are glued. By a further rotation of the vacuum cylinder the label with the initial gluing is transferred to the passing container, and by the rotation of the containers about their own axis the label is for example arranged without creases on the container by brushing on or a rolling board.

A construction of a vacuum cylinder which is known from conventional art is in multiple parts, that is to say it can for example accommodate four or six labels on the circumference. Since a flexible line does not process containers with the same diameter continuously, but also processes mixed ones, no closed vacuum cylinder can be used, since collisions with larger containers can occur. In one embodiment, therefore, it is proposed that the vacuum cylinder is not a closed body, but has a segmented construction, for example in two parts, in order to allow larger containers to pass between the two segments. Thus, for example cut outs, through which in particular larger containers can be transported, can be provided in the circumferential direction of the vacuum cylinder. In this case a rotation of the vacuum cylinder can be adapted to the transport of the containers so that during transport a cut out of the vacuum cylinder lies opposite larger containers.

Particularly the vacuum cylinder has a segment. By a high-performance servo drive this segment can if required accelerate from a maintenance or rest position and can collect the cut label for example from a cutting unit, can for example move past a glue roller and simultaneously therewith can glue the label. Then the label can be transferred to the container. Already with the next container the segment can move into a maintenance or rest position, since this container is not labeled by the assembly.

In preferred embodiments a gluing element, such as in particular a glue roller, is provided, which performs the gluing of a label. Alternatively, or in addition, hot glue spray systems can be provided. A preferred brushing on for the labeling process can be implemented with a brush-on element which is not arranged stationary. In this case it is possible that each container plate region has its own brush segment or is equipped with such a brush segment.

Since it is not defined beforehand which container is labeled on which container plate, it is preferable that a maximum possible label height or label position can be covered or also adjusted by a brush body. In this case it is possible that such a brush body can be pivoted towards the container, since this can be disruptive during the transfer or discharge. After the transfer of an incoming container onto the container plate, the brush body pivots on a container shell.

Since the container diameter may be different, the brush element is pressed against the container by means of a spring with a predeterminable force. In this way it is possible to compensate for the different container diameters. Before discharge of the containers from the machine, the brush element should be pivoted back into a starting position. In this case it is possible that for example a control, such as a cam control, is used. This can serve to switch on the devices also individually for example when a dispensing unit is reached. It would also be possible to use a quick-acting valve (for instance a pusher cylinder) to be used, in order to achieve such a movement of the brush element.

A cutting unit of the labeling device is also adapted to the corresponding control. In this case it is possible that this cutting unit very dynamically cuts a label from the roller to a label length and transfers it to a corresponding segment gripper. In addition, one or more label magazines can also be provided, which are suitable in particular for dispensing a plurality of different label types. In this way the comfort and the flexibility of the labeling assemblies can also be increased.

Additionally, or also alternatively an application of self-adhesive labels can also be provided. In this case, particularly, a machine for applying self-adhesive labels has a feed device which feeds labels arranged on supports. Furthermore, a dispensing element such as a dispensing edge is provided, around which the labels are deflected in order thus to detach the label from its support. A corresponding dispensing edge is pivotable, so that larger containers in circulation do not collide with a dispensing edge. When this dispensing edge is pivoted away it is preferable that a belt tension of the carrier belt is maintained. Thus, for example a highly dynamic belt tension modulus can be provided.

At the same time or additionally a direct printing of the containers for example by inkjet technology can also be provided. This may also supersede the currently known labeling technology and may also allow new possibilities for container decoration.

Such a printing technology can also be used in the aforementioned machines or in the function network. The process steps of pre-treating, printing and final curing for example can be integrated here. Descriptions, functional sequences and the like are to some extent known from the internal conventional art in the name of the applicant. Here are a plurality of systems are conceivable, which use different container receptacles in the container table. The machine has at least one printing device, such as in particular a print head.

In this case this print head is suitable and intended for printing different images onto an outer wall of the containers. A plurality of such printing devices can also be provided, wherein in turn the individual printing devices can be assigned to specific heating stations, so that for example after a plastic preform heated by a specific heating station has been shaped into a container it is imprinted by a specific printing device.

In further advantageous embodiments the machine has a filling device for filling plastic containers. In this case this filling device can be arranged for example downstream of the reshaping device, and it may be provided upstream or downstream of the decorating device. This filling device advantageously has a plurality of filling elements, wherein the filling elements have filling valves which are suitable and intended for filling the containers with different products.

Thus, the containers are transferred to the filling device after the labeling. A cooling container base can be integrated, as mentioned above, between the decorating device, such as for instance the labeling device, and the filling device. However, this container base can be oriented according to the process or the container quality. Possible embodiments of a container cooling are set out above. A transport device is provided, which transfers the containers to the filling device by neck handling, that is to say with gripping elements which grip the containers at or below their mouths. The filling device particularly has a rotatable support on which a plurality of filling elements are arranged.

In a preferred embodiment the filling device has at least two receiving devices or reservoirs to accommodate a liquid to be introduced, in particular a beverage to be introduced. The filling device has a plurality of conduits which are formed separately from one another and lead to a specific filling element. In this way a changeover from one beverage to be introduced on another beverage to be introduced can be achieved very quickly.

In preferred embodiments the machine has a closer device for closing the containers with container closures, wherein this closer device is suitable and intended for closing the containers with at least two different types of container closures. The containers to be filled with different products can be closed by different closures, for example closures of different colours. In this case it is possible that this closer device has a plurality of, for example at least two, at least three closure feeds, which can feed the necessary closures as required. In this case for example a receiving station, such as a picking station, can be used, which picks off the closures and transfers them to the relevant closing element.

It is known from conventional art that after the closing device containers are transferred onto a subsequent transport belt. This can take place for example by means of a lowering star wheel. However, since containers which differ in terms of diameter and height leave the system, it is preferable that they are transferred in a controlled manner to such an outfeed belt.

In preferred embodiments such a transport device has a toothed belt which is particularly equipped with an actively controllable clip and takes the closed containers from a closer carousel at a defined spacing.

Particularly the machine has a transport belt and in particular a transport belt rising obliquely in the transport direction, which is particularly arranged below this toothed belt.

The toothed belt can convey the containers out of the filling device by neck handling. As soon as the highest or longest container makes contact with the transport belt running synchronously below it, the clip can be actively opened, that is to say the container is further transported from here by means of the transport belt.

Smaller containers, spatially offset, can later make contact with the transport belt and accordingly the clips must be opened later in the transport direction. In this case it is possible that the machine has a quick-start valve, such as for instance a pusher cylinder, which can control the clips according to the container height. The place and/or time of the control for the clips can be initiated by a sensor system (a sensor system for the container heights) or by a controller (such as for instance tracking of a container, encoding of the container, a shift register or the like). Furthermore, it would also be conceivable that an RFID or QR code recognition or other code recognition is present, which facilitates a still higher flexibility in relation to product tracking and plant control and moreover brings with it one or other customer benefit (such as for instance product information, advertising options, product tracking or logistic advantages).

In further advantageous embodiments further modules are present downstream of the closer, which in particular can also further process different containers in a packaging line. In this case processing individually, such as is required by the customer or end user, can lead to a combination of products.

In order to minimize the complexity of the entire plant, it is also possible that the occupancy, the distribution of the containers in the blow molding machine and/or the decorating device is fixed according to certain criteria. In this case for example it is possible to select whether the containers are processed in the arrangement large-small-medium-large-small-medium etc. or in the variant large-large-large-small-small-small-medium-medium-medium etc. However, these sequences can also be freely selected and particularly can be predetermined by a user, such as for instance a customer. Overall it is possible that the entire system makes products available in a mixed system or according to a single type. In this way a maximum flexibility of the plant is achieved.

BRIEF DESCRIPTION

Some of the embodiments will be described in detail, with reference to the following figures, wherein like designations denote like members, wherein.

DETAILED DESCRIPTION

Figure 1:
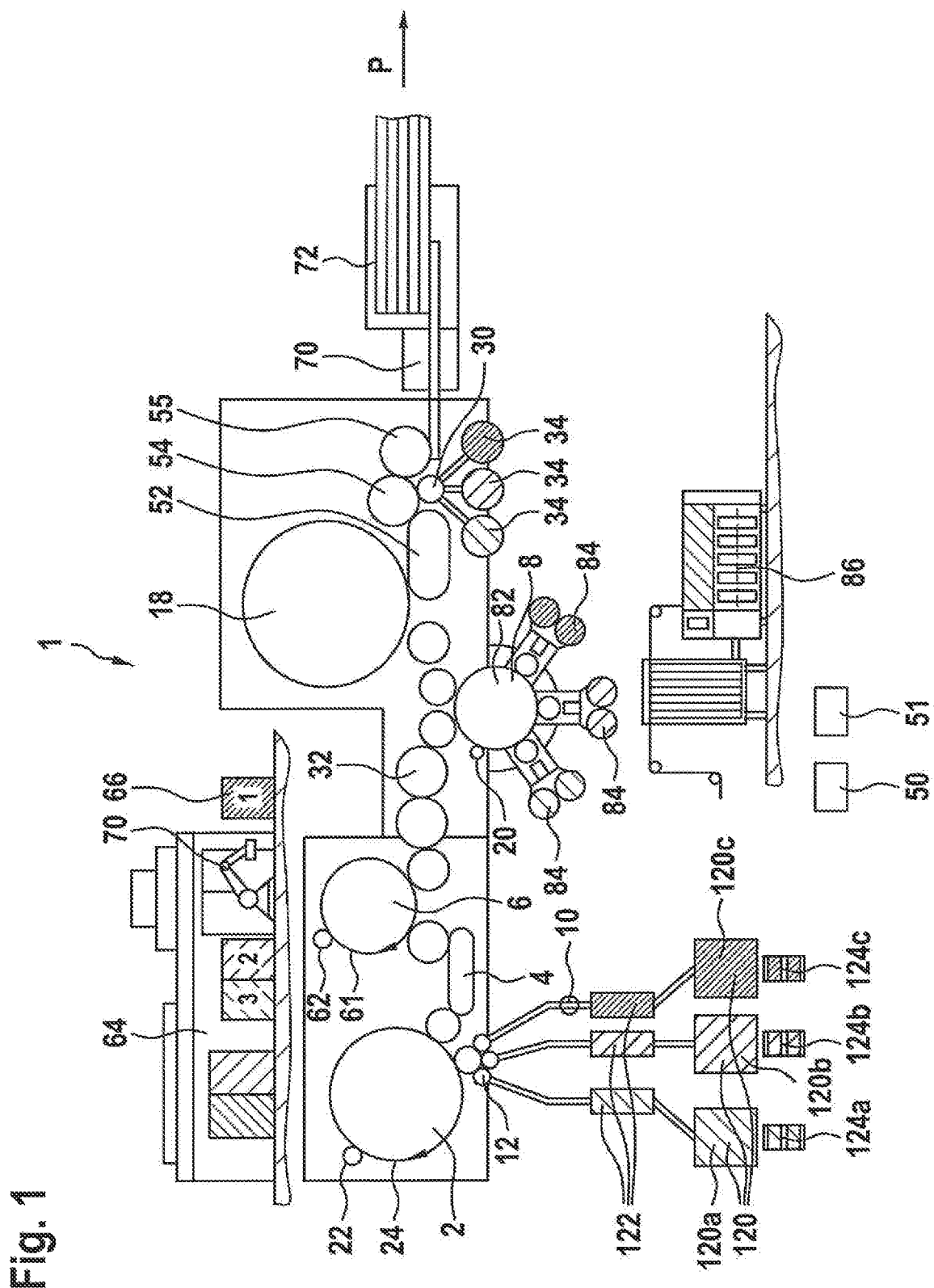
FIG. 1 shows a representation of a machine according to embodiments of the invention.

FIG. 1 shows a representation of a device 1 according to embodiments of the invention for treatment of containers. In this case the reference numeral 12 relates to a feed device which serves for feeding plastic preforms 10 to a heating device designated as a whole by 2. This feed device here has holding devices 120, more precisely three holding devices 120a, 120b, 120c, in which the plastic preforms 10 are held. The plastic preforms can be stored beforehand in magazines 124a, 124b, 124c. The reference numeral here designates sorting devices, more precisely three roller sorters, which serve in order to orient the plastic preforms.

The plastic preforms are transferred to the heating device. This has a rotatable support 24 on which a plurality of heating stations 22 are arranged.

After heating, the plastic preforms are transported by means of a transport device 4 (which for example may have a long stator system) to a reshaping device 6. In this case this reshaping device 6 has a movable and in particular rotatable support 61 on which a plurality of reshaping stations 62 are arranged.

The reference 64 designates in its entirety a changing device which serves for changing the blow molds which are arranged on the individual reshaping stations. In this case this changing device can have a handling device such as in particular a changing robot which serves for automatic changing of the blow molds. The reference numeral 66 relates to a magazine for holding blow molds and blow mold parts.

The reference numeral 32 designates a cooling device which serves for cooling the containers, in particular for cooling the bases thereof. The reference numeral 8 relates to a decorating device which serves for decorating the containers. In the embodiment shown in FIG. 1 the decorating device is a labeling machine which applies labels to the containers 20. Here this labeling device has three labeling assemblies, which can apply different labels selectively to the containers. As mentioned above, a specific heating station can be assigned to a specific labeling assembly. The reference numeral 82 designates a transport device, such as in particular a rotatable support, which serves for transporting the containers during the labeling thereof. The reference numeral 86 designates a label store, which can serve for example to make different labels available.

The reference numeral 18 designates a filling device which serves for filling the containers. The filled containers are transported to a closing device by means of a transport device 52. In this case this transport device 52 may be suitable and intended to change a sequence of the transported containers.

The reference numeral 30 designates a closer device which closes the filled containers with closures. This closer device 30 can also have a plurality of, in this case three feed devices 34, which can feed different types of closures (for instance closures with different colours). In addition, the closer device has a rotatable support which serves for transporting the containers during the closing process.

The reference numeral 55 designates a further transport device which serves for further transport of the containers, which are now filled and closed, for instance to a grouping device which divides the containers into groups. In this case this grouping device may again have a plurality of transport devices for transporting the containers. The reference P designates the transport direction of the containers.

The reference numeral 50 designates the assigning device which assigns a specific reshaping station to a specific heating station 22. In this case a control device 51 can be provided, which causes plastic preforms heated by a specific heating station 22 to be reshaped into containers by a predetermined reshaping station 62. Thus, for instance the control device can control the transport device 4 in such a way that specific heated plastic preforms are fed to specific reshaping stations.

Figure 2:
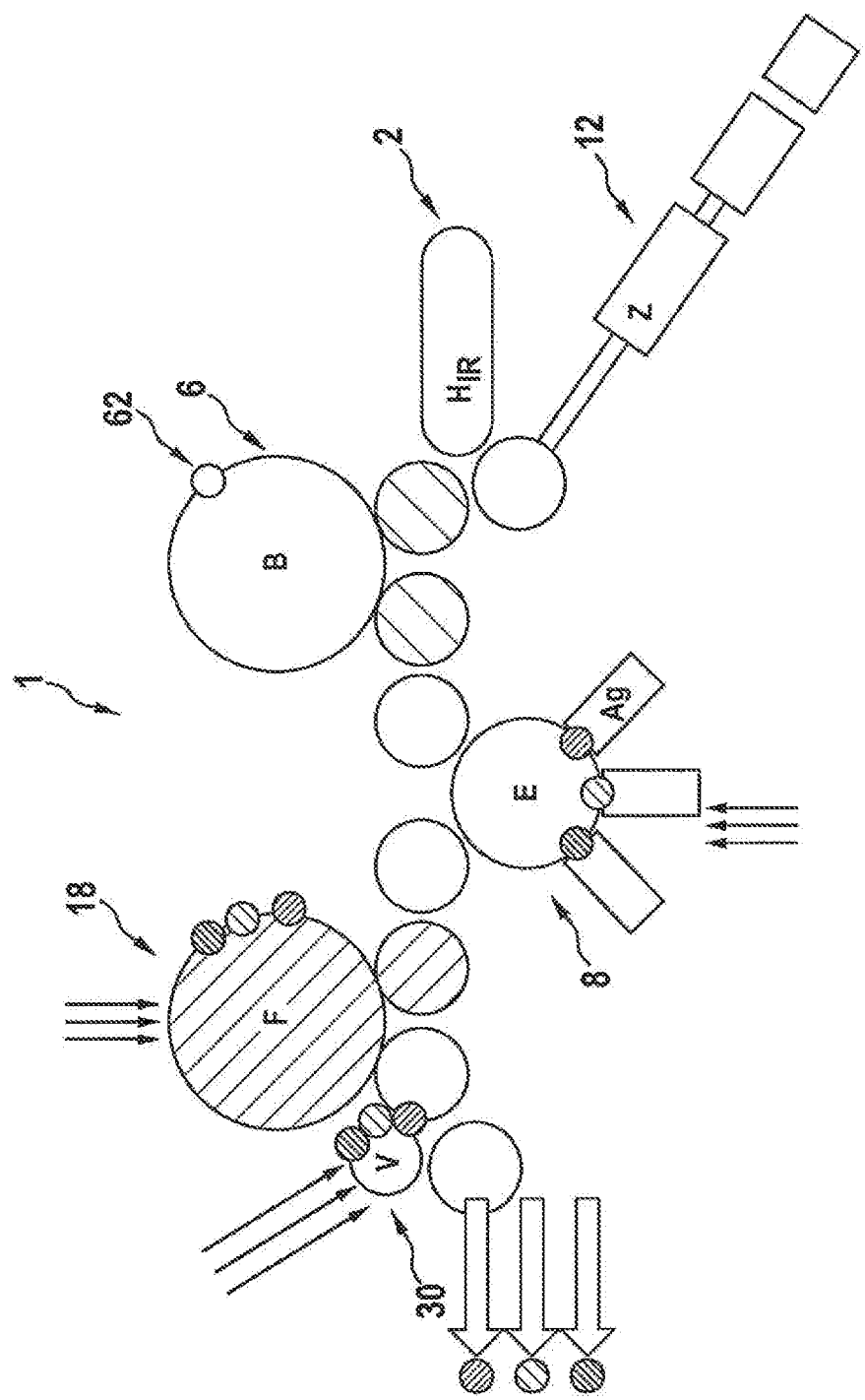
FIG. 2 shows a possible configuration of a machine according to embodiments of the invention.

FIG. 2 shows a possible configuration of a device 1 according to embodiments of the invention. In this device only one specific type of plastic preforms is fed and thus heated. The reshaping device 6 is also configured according to a single type. However, the containers, which are therefore uniform, can then be provided with three different labels by the decorating device and then can be filled with three different liquids by a filling device 18. The closing device makes it possible to close the containers with three different types of closure. Thus, the device shown in FIG. 2 allows the production of three different products which, however, all have the same container size. In this case this device can control the amounts of the respective beverages which are to be introduced into the containers. Thus, three types with different beverages and correspondingly also different labels and closures can be produced.

Figure 3:
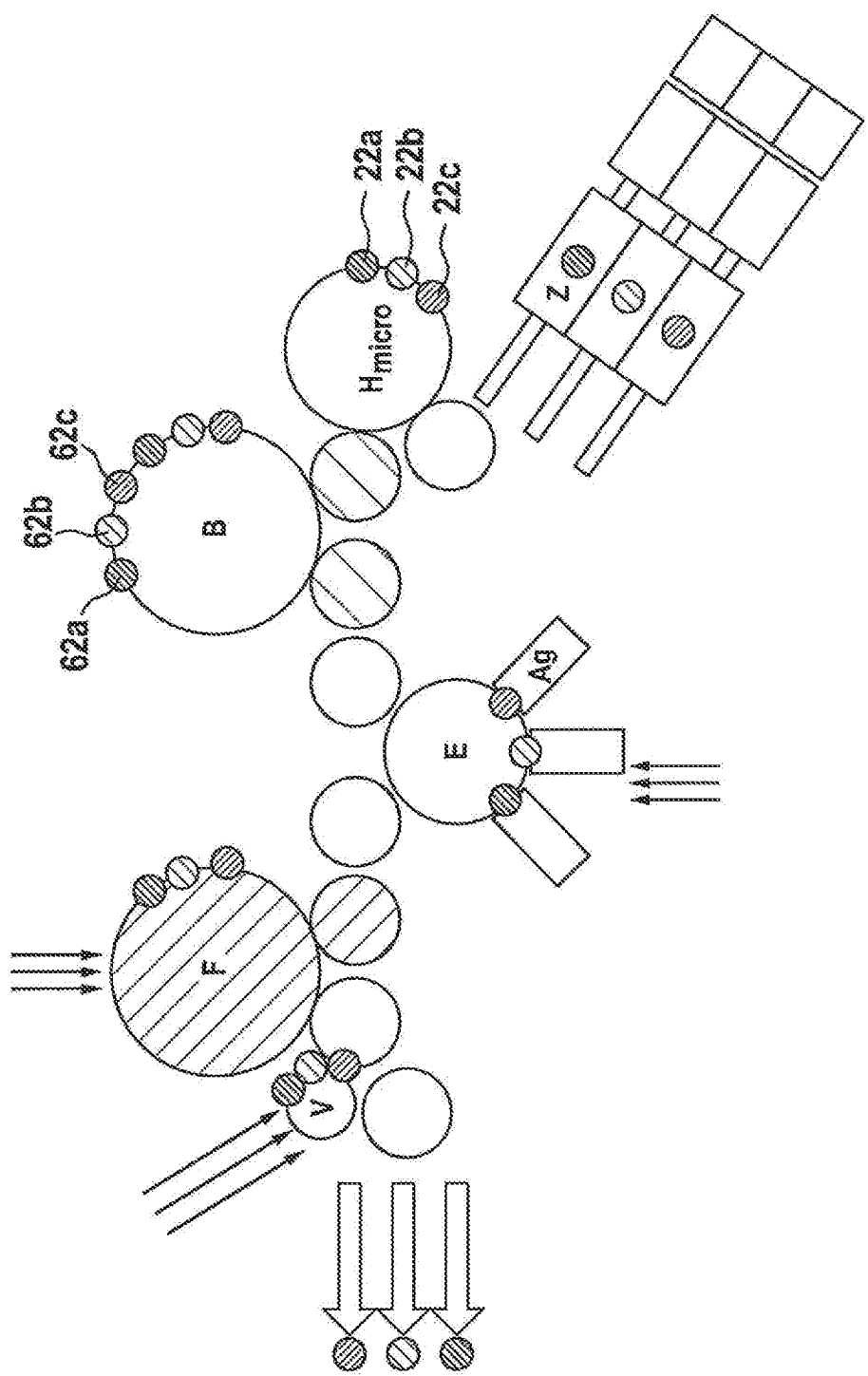
FIG. 3 shows a possible configuration of a machine according to embodiments of the invention.

The device 1 shown in FIG. 3 additionally facilitates the feeding of three different types of plastic preforms. Here the reshaping device 6 is equipped with three different types of blow molds. In this case the individual reshaping stations 62a, 62b and 62c are assigned to the individual heating stations 22a, 22b and 22c, that is to say plastic preforms heated by the heating station 22a are then expanded by the reshaping station 62a. Here too, the labeling is again possible with three different labels, the filling with three different liquids is also possible. Thus, the plant shown in FIG. 3 enables the production of a total of 9 different product variants, wherein this production is in particular also possible substantially simultaneously.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES 1 device
2 heating device 4 transport device
6 reshaping device
10 plastic preforms
12 feed device for plastic preforms
18 filling unit
20 container
22, 22a-c heating station
24 rotatable carrier
30 closer device
32 cooling device
34 feed device
50 assigning device
51 control device
52 transport device
55 transport device
61 rotatable support of the reshaping device
62, 62a-c reshaping station
64 changing device
66 magazine for blow molds
70 changing robot
122 sorting devices
120, 120a-c holding device for plastic preforms
124a-c magazines

The invention claimed is:

1. A device for treating containers, comprising a heating device for heating plastic preforms, wherein the heating device has heating stations which are suitable for individually heating the plastic preforms, and wherein the heating device has a transport device which transports the plastic preforms individually through the heating device, and comprising a reshaping device which is suitable and intended for reshaping the plastic preforms heated by the heating device into plastic containers, wherein the reshaping device is arranged downstream of the heating device in the transport direction of the plastic preforms, and wherein the reshaping device has a movable support, on which reshaping stations are arranged for reshaping the plastic preforms into the plastic containers, and comprising a transport device, which is suitable and intended for transporting the heated plastic preforms individually from the heating device to the reshaping device, and a decorating device, which is arranged downstream of the reshaping device in the transport direction of the plastic containers, wherein this decorating device has a transport device for individually transporting the plastic containers, and the decorating device has at least one decorating assembly or a plurality of decorating assemblies which are suitable and intended for decorating the plastic containers, wherein the device has an assigning device and/or an assigning option which allows at least one assigning process of at least one heating station, at least one reshaping station, at least one equipping assembly, and at least one filling element of a filling device,
wherein the assignment at least in some instances enables the substantially simultaneous production of two different products, without refitting work having to be carried out on the device, wherein the decorating device is a labelling, wherein the filling device has a plurality of filling elements, wherein the filling elements have filling valves which are suitable and intended for filling the plastic containers with different products and at least one filling valve is a flexible filling valve which can fill up to five different products and quantities of products, so that simultaneous filling with different products is possible.

2. The device according to claim 1, wherein the transport device of the heating device has a movable support on which the heating stations are arranged.

3. The device according to claim 1, wherein the device for treating containers has at least one feed device for feeding plastic preforms to the heating device, wherein this feed device is suitable and intended to feed at least two different types of plastic preforms to the heating device selectively and individually.

4. The device according to claim 1, wherein the device for treating containers has a changing device which facilitates a change of blow molds of any individual reshaping station.

5. The device according to claim 1, wherein the transport device of the reshaping device is suitable and intended for changing a sequence of plastic preforms discharged from the heating device, so that these plastic preforms are transferred to the reshaping device in a modified sequence.

6. The device according to claim 1, wherein a cooling device for cooling the plastic containers is provided between the reshaping device and the decorating device.

7. The device according to claim 1, wherein the decorating device is suitable and intended for decorating different container formats.

8. The device according to claim 1, wherein a filling device for filling the plastic containers is provided, which facilitates filling of the containers with different liquids.

9. The device according to claim 1, wherein the device for treating containers has a closer device for closing the containers with container closures, wherein this closer device is suitable and intended for closing the containers with at least two different types of container closures.

10. A method for treating containers using a device, wherein plastic preforms are heated by a heating device, wherein the heating device has heating stations which heat the plastic preforms individually and wherein a transport device transports the plastic preforms individually through the heating device, wherein furthermore a reshaping device reshapes the plastic preforms heated by the heating device into plastic containers, wherein the reshaping device is arranged downstream of the heating device in the transport direction of the plastic preforms, and wherein the reshaping device has a movable support, on which reshaping stations are arranged for reshaping the plastic preforms into the plastic containers, and a transport device is provided for transporting the heated plastic preforms individually from the heating device to the reshaping device, and a decorating device is provided, which is arranged downstream of the reshaping device in the transport direction of the plastic containers, wherein this decorating device has a transport device for individual transport of the plastic containers, and wherein the decorating device has at least one decorating assembly or a plurality of decorating assemblies which decorate the plastic containers, wherein at least one assignment between at least one heating station, at least one reshaping station, at least one equipping assembly, and at least one filling element of a filling device is enabled,
wherein the assignment at least in some instances enables the substantially simultaneous production of two different products, without refitting work having to be carried out on the device, wherein the decorating device is a labelling, wherein the filling device has a plurality of filling elements, wherein the filling elements have filling valves which are suitable and intended for filling the plastic containers with different products and at least one filling valve is a flexible filling valve which can fill up to five different products and quantities of products, so that simultaneous filling with different products is possible.

11. The device according to claim 1, wherein the device for treating containers machine has a changing robot which facilitates a change of blow molds of any individual reshaping station.

\* \* \* \* \*